United States Patent
Loh et al.

(10) Patent No.: US 12,299,445 B2
(45) Date of Patent: May 13, 2025

(54) REGISTER BASED SIMD LOOKUP TABLE OPERATIONS

(71) Applicant: Advanced Micro Devices, Inc., Santa Clara, CA (US)

(72) Inventors: Gabriel H. Loh, Bellevue, WA (US); Yasuko Eckert, Bellevue, WA (US); Bradford Beckmann, Bellevue, WA (US); Michael Estlick, Ft. Collins, CO (US); Jay Fleischman, Merrill, WI (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/833,504

(22) Filed: Jun. 6, 2022

(65) Prior Publication Data
US 2023/0393855 A1    Dec. 7, 2023

(51) Int. Cl.
*G06F 9/30*    (2018.01)

(52) U.S. Cl.
CPC ........ *G06F 9/3004* (2013.01); *G06F 9/30036* (2013.01)

(58) Field of Classification Search
CPC . G06F 9/30043; G06F 9/30036; G06F 9/3887
See application file for complete search history.

(56) References Cited

U.S. PATENT DOCUMENTS

| | | | | |
|---|---|---|---|---|
| 7,467,287 B1 * | 12/2008 | Bratt | ..................... | G06F 9/3004 |
| | | | | 712/4 |
| 7,739,319 B2 * | 6/2010 | Macy, Jr. | ............ | G06F 9/30025 |
| | | | | 708/200 |
| 2010/0106944 A1 * | 4/2010 | Symes | ................ | G06F 9/30021 |
| | | | | 712/E9.028 |
| 2016/0124651 A1 * | 5/2016 | Sankaranarayanan | ....................... | |
| | | | | G06F 9/30036 |
| | | | | 711/165 |
| 2017/0003966 A1 * | 1/2017 | Haraden | ............. | G06F 9/30043 |
| 2017/0046156 A1 * | 2/2017 | Mahurin | ............. | G06F 9/30003 |
| 2020/0380035 A1 * | 12/2020 | Bhoria | ................ | G06F 9/30101 |

OTHER PUBLICATIONS

ARM® Compiler Version 6.6 armasm User Guide, ARM, p. 14-745 (Year: 2016).*
"Arm A64 Instruction Set for A-profile architecture", March, ARM, pp. 1565-1566 (Year: 2022).*
"Arm A64 Instruction Set for A-profile architecture", November, ARM, pp. 1381-1384 (Year: 2023).*
Intel® Architecture Instruction Set Extensions Programming Reference, August, Intel, p. 5-883 to 5-884 (Year: 2015).*

* cited by examiner

*Primary Examiner* — Courtney P Spann
(74) *Attorney, Agent, or Firm* — Hickman Becker Bingham Ledesma LLP; Albert Lee

(57) ABSTRACT

An approach is provided for implementing register based single instruction, multiple data (SIMD) lookup table operations. According to the approach, an instruction set architecture (ISA) can support one or more SIMD instructions that enable vectors or multiple values in source data registers to be processed in parallel using a lookup table or truth table stored in one or more function registers. The SIMD instructions can be flexibly configured to support functions with inputs and outputs of various sizes and data formats. Various approaches are also described for supporting very large lookup tables that span multiple registers.

20 Claims, 7 Drawing Sheets

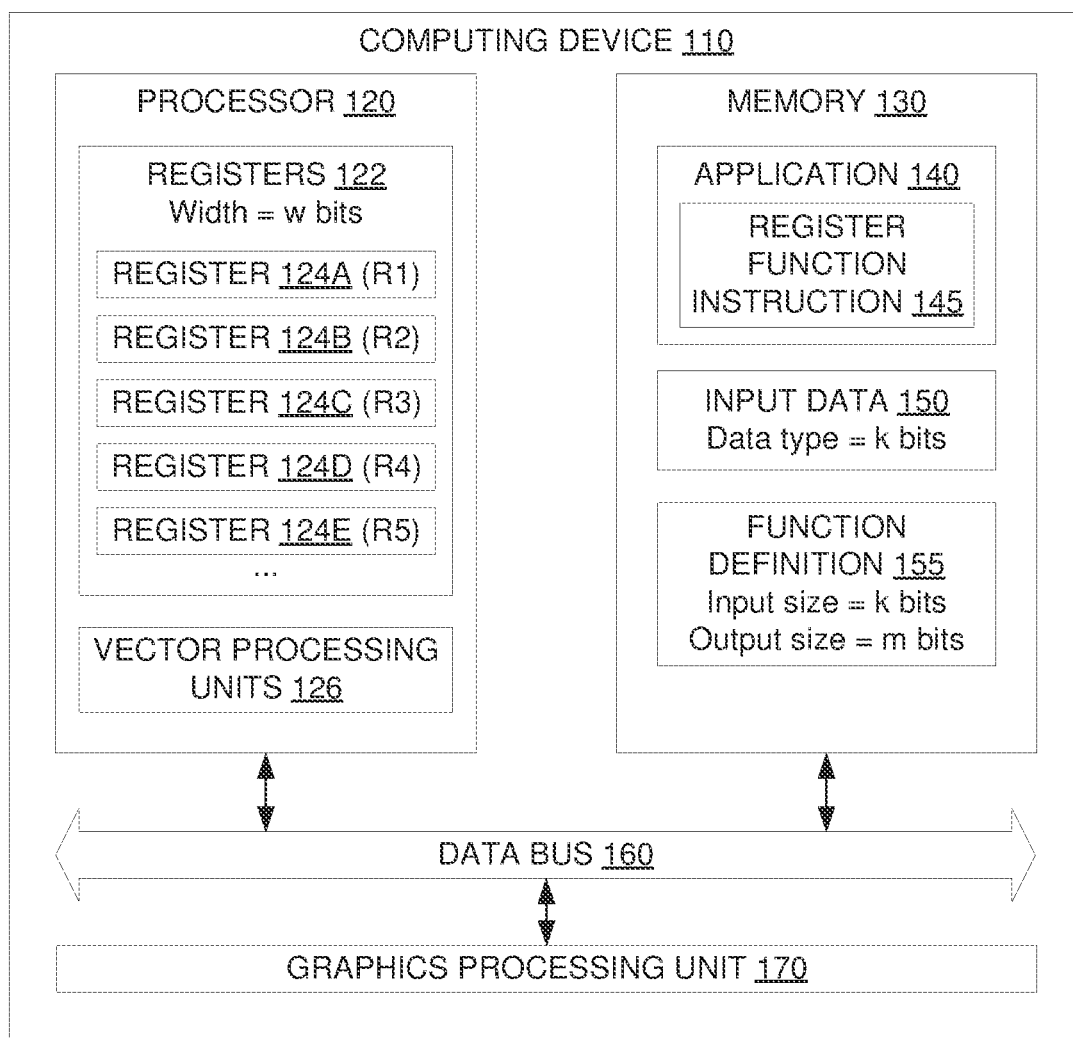

FIG. 1C

FUNCTION DEFINITION 155 ($f_{k,m}$)

Example: k=8, m=1, definition requires (2^k) * m bits, or (2^8) * 1 = 256 bits.
Example function: Return whether input is a prime number.

Input Value (k bits wide)
Range: [0 ~ 255] or [0 ~ (2^k) – 1]
0.....................................0
1.....................................0
2.....................................1
3.....................................1
4.....................................0
5.....................................1
6.....................................0
7.....................................1
8.....................................0
9.....................................0
10...................................0
11...................................1
.                                         .
.                                         .
.                                         .
253.................................0
254.................................0
255.................................0

Output Value (m bits wide)
Range: [0 ~ 1] or [0 ~ (2^m) – 1]

FIG. 1D

```
APPLICATION 140

10    Load FUNCTION DEFINITION 155 into R1 (REGISTER 124A)
20    Load next chunk of INPUT DATA 150 into R2 (REGISTER 124B)

# Since INPUT DATA 150 is a data type of 8 bit values and R2 is a 512 bit
# wide register, next chunk has 64 values (512/8) from INPUT DATA 150

30    vlut_8_1 R1, R2, R3

# Invoke REGISTER FUNCTION INSTRUCTION 145
# For each 8-bit input value in R2, use the lookup table / function defined in
# R1 and output the 1-bit results into R3 (REGISTER 124C)

40    Use R3 according to application requirement
50    Iterate 20-40 until all of INPUT DATA 150 has been processed
```

REGISTERS 122
Width w = 512 bits. Example content after executing APPLICATION 140.

REGISTER 124A (R1)
256 1-bit lookup values, Bit Offsets 256-511 unused

| | | | | | |
|---|---|---|---|---|---|
| Index | 0 | 1 | 2 | 3 | ... 255 |
| Bit Offset | 0 | 1 | 2 | 3 | ... 255 |
| Value (m = 1: 1 bit wide) | 0 | 0 | 1 | 1 | ... 0 |

REGISTER 124B (R2)
64 8-bit input values (vector)

| | | | | | |
|---|---|---|---|---|---|
| Index | 0 | 1 | 2 | 3 | ... 63 |
| Bit Offset | 0 | 7 | 15 | 23 | ... 503 |
| Value (k = 8: 8 bits wide) | 37 | 134 | 2 | 201 | ... 11 |

REGISTER 124C (R3)
64 1-bit output values, each with 7 bits padding

| | | | | | |
|---|---|---|---|---|---|
| Index | 0 | 1 | 2 | 3 | ... 63 |
| Bit Offset | 0 | 7 | 15 | 23 | ... 503 |
| Value (m = 1: 1 bit wide) | 1 | 0 | 1 | 0 | ... 1 |

FIG. 3

300

310
RECEIVE AN INSTRUCTION FOR APPLYING A FUNCTION TO A PLURALITY OF INPUT VALUES IN A SOURCE REGISTER, WHEREIN THE INSTRUCTION SPECIFIES AT LEAST ONE FUNCTION REGISTER THAT STORES A LOOKUP TABLE

312
STORE A PLURALITY OF OUTPUT VALUES INTO A TARGET REGISTER OF A PLURALITY OF REGISTERS BY REFERENCING THE LOOKUP TABLE, FROM THE AT LEAST ONE FUNCTION REGISTER, FOR EACH OF THE PLURALITY OF INPUT VALUES IN THE SOURCE REGISTER IN PARALLEL

REGISTER BASED SIMD LOOKUP TABLE OPERATIONS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Data intensive compute workloads can be accelerated by using lookup tables, also referred to as truth tables for Boolean functions. These tables store in advance the results for a range of inputs applied to a function, thereby allowing real-time applications to reference the lookup table with the pre-calculated results instead of repeatedly performing the function calculation on demand. When working with large data sets, computational overhead can be significantly reduced by preparing and using lookup tables for functions that are applied to large amounts of data.

Existing approaches for implementing lookup table operations on computing devices have significant limitations on performance, limited flexibility for supporting dynamic and large lookup tables, and inefficient levels of parallelism. Accordingly, the potential benefits of using lookup tables are not fully realized.

There is, therefore, a need for a solution to the technical problem of how to provide a more flexible way to support lookup table operations while maintaining high performance and parallelism.

BRIEF DESCRIPTION OF THE DRAWINGS

Implementations are depicted by way of example, and not by way of limitation, in the figures of the accompanying drawings and in which like reference numerals refer to similar elements.

FIG. 1A is a block diagram that depicts an example system architecture for implementing register based SIMD lookup table operations in a computing device.

FIG. 1B is a block diagram that depicts an example register function instruction 145 of FIG. 1A.

FIG. 1C is a block diagram that depicts an example function definition 155 of FIG. 1A.

FIG. 1D is a block diagram that depicts example pseudocode for application 140 of FIG. 1A, and example data for registers 122 of FIG. 1A.

FIG. 3 is a flow diagram that depicts an approach for implementing register based SIMD lookup table operations.

DETAILED DESCRIPTION

Figure 2A:
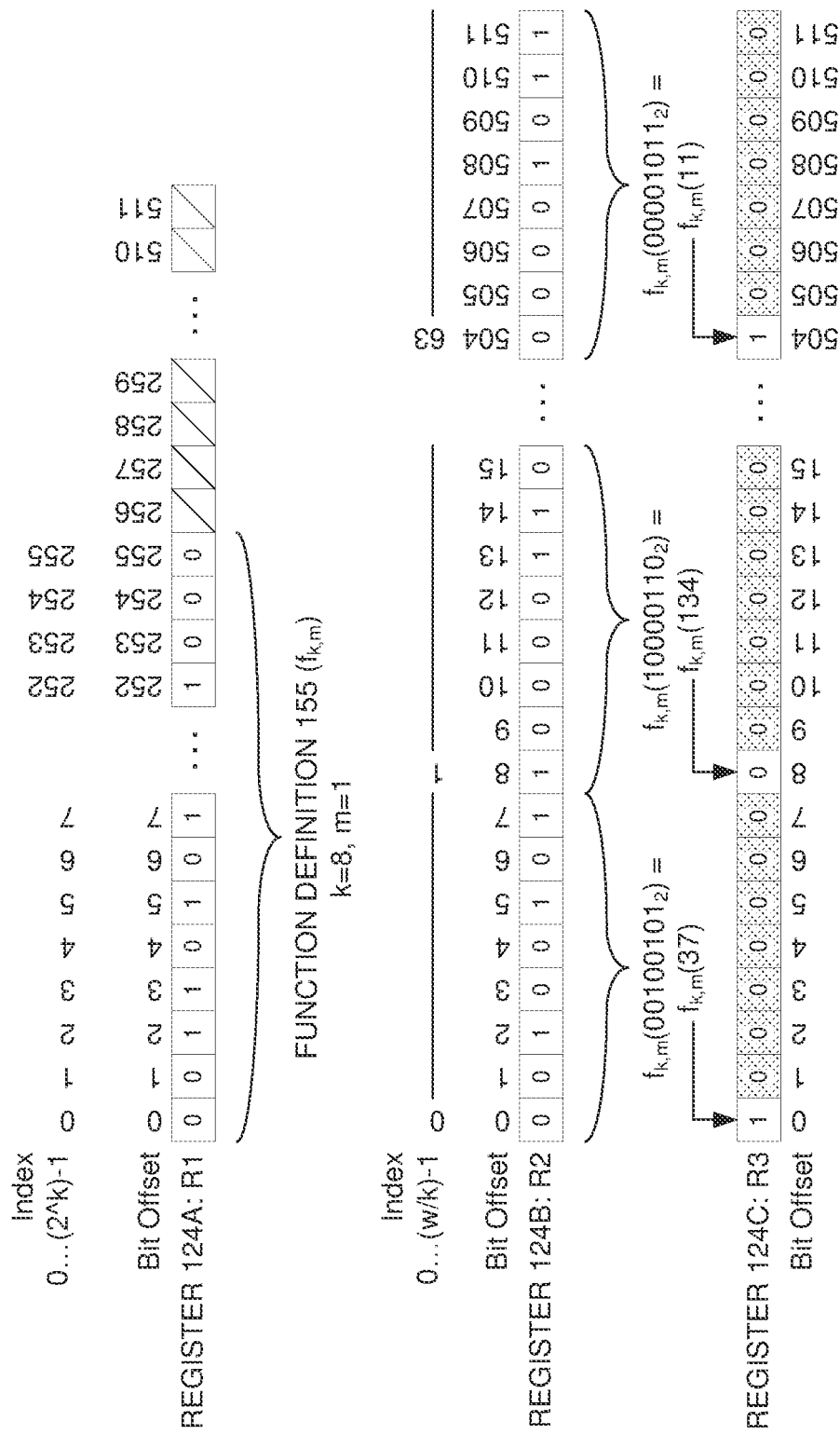
FIG. 2A is a block diagram that depicts SIMD processing of a lookup table operation with an example function using 8-bit inputs and 1-bit outputs, wherein a lookup table for the function is stored in register 124A.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
III. Example SIMD Instruction for Register Based Lookup Table Operation
IV. Example Lookup Table Function Definition
V. Example Application Pseudocode
VI. Using Register Based SIMD Lookup Table Operations
   A. Example Process using Function with 8-bit Inputs, 1-bit Outputs
   B. Example Process using Function with 8-bit Inputs, 2-bit Outputs
   C. Example Process using Function with 8-bit Inputs, 4-bit Outputs
   D. Extensions for Large Lookup Tables
VII. Example Register Based SIMD Lookup Table Operation Process

I. Overview

As discussed in the background, existing approaches for implementing lookup table operations suffer from limitations on performance. For example, existing approaches often store the lookup tables in memory. This incurs a significant performance penalty from memory overhead, as a significant number of data transfers between memory and CPU registers are necessary to use the lookup tables. Further, obtaining high levels of parallelism is difficult when using in-memory lookup tables, further limiting performance.

To improve performance and parallelism, some approaches use single instruction, multiple data (SIMD) instructions to perform lookup table operations in parallel to multiple values stored in registers (also referred to as vectors), wherein the lookup table is encoded in the SIMD instruction. For example, the vector permute ternary logic (VPTERN) SIMD instructions in the Advanced Vector Extensions (AVX-512) for the x86 instruction set architecture (ISA) allow a lookup table for a function with 3-bit inputs and 1-bit outputs to be encoded as an immediate 8-bit value within the SIMD instruction. The LOP3.LUT instruction for Nvidia graphics processing unit (GPU) architectures provides similar functionality.

Since the above approaches encode the lookup table as an immediate value of the SIMD instruction, the lookup table is statically encoded at compile time. Similarly, the use of a Field Programmable Gate Array (FPGA) or other configurable circuit requires the lookup table to be statically encoded at configuration time. This static encoding limits application flexibility as dynamic construction, retrieval, and modification of the lookup tables is not possible or very expensive.

Further, storing the lookup table in an immediate value field in a SIMD instruction significantly restricts the size of the lookup table. For example, while a function with ternary (3-bit) inputs and binary (1-bit) outputs only requires 8 bits for storing the lookup table and can therefore comfortably fit within an immediate value field, other functions require much larger inputs and outputs. In general, a function with k input bits and m output bits requires (2^k)*m bits to store a corresponding lookup table. For example, a lookup table for a function using 8-bit inputs and 4-bit outputs requires (2^8)*4=1024 bits, which exceeds the typical size limit for an entire instruction in most ISAs.

Accordingly, an approach is provided for implementing register based SIMD lookup table operations. According to the approach, an ISA can support one or more SIMD instructions that enable vectors or multiple values in source data registers to be processed in parallel using a lookup table or truth table stored in one or more function registers. The SIMD instructions can be flexibly configured to support functions with inputs and outputs of various sizes and data formats. Various approaches are also described for supporting very large lookup tables that span multiple registers. This technical solution provides support for a much wider range of possible functions while maintaining a high degree of parallelism and significantly reducing memory transfer overhead.

Register based SIMD lookup table operations avoid the disadvantages associated with existing approaches to lookup table operations, such as increased memory transfer overhead and static lookup table encoding. Data can therefore be processed in a more efficient manner with higher performance, reduced overhead, greater parallelism, and more flexibility to support dynamic and large lookup tables. The described register based SIMD lookup table operations are widely applicable to many fields such as cryptography, image and video processing, string and text manipulation, signal processing, genomic sequencing, and more. The described techniques can be applied to any computing device with parallel processing units, including but not limited to central processing units (CPUs) and graphics processing units (GPUs).

II. Architecture

FIG. 1A is a block diagram that depicts an example system architecture 100 for implementing register based SIMD lookup table operations in a computing device 110. Computing device 110 corresponds to a workstation or a server with one or more processing units, such as general-purpose multicore processors and graphics processing units (GPUs). Computing device 110 includes processor 120, memory 130, data bus 160, and graphics processing unit (GPU) 170. Processor 120 includes registers 122 and vector processing units 126. Registers 122 include register 124A (R1), register 124B (R2), register 124C (R3), register 124D (R4), and register 124E (R5). Each of registers 122 stores w bits of data, such as 512 bits, 1024 bits, 2048 bits, or any number of bits. In implementations, registers 122 includes additional registers that are not shown. Memory 130 includes application 140, input data 150, and function definition 155. Input data 150 includes data using a data type or data size of k bits, such as 4 bits, 8 bits, 16 bits, 32 bits, or any number of bits. Function definition 155 defines a function with inputs having a data type or data size of k bits, and outputs having a data type or data size of m bits, such as 1 bit, 2 bits, 3 bits, 4 bits, or any number of bits. Application 140 includes register function instruction 145. The components of system 100 are only exemplary and any configuration of system 100 is usable according to the requirements of application 140.

Application 140 utilizes processor 120, memory 130, data bus 160, GPU 170, and other computing resources not specifically depicted. Processor 120 is any type of general-purpose single or multi core processor, or a specialized processor such as application-specific integrated circuit (ASIC) or field programmable gate array (FPGA). In some implementations, computing device 110 is a multi-processor device. Memory 130 is any type of memory, such as a random access memory (RAM) or other dynamic storage device. Data bus 160 is one or more high-speed interconnects for communications between components of computing device 110, such as a Peripheral Component Interconnect (PCI) Express bus, an Infinity Fabric, or an Infinity Architecture. GPU 170 is any type of specialized hardware for graphics processing, which is addressable using various graphics application programming interfaces (APIs) such as DirectX, Vulkan, OpenGL, OpenCL, HIP, and CUDA.

In one implementation, processor 120 executes application 140. During the execution, processor 120 reads and executes register function instruction 145 to process input data 150 through a function defined by function definition 155. For example, function definition 155 is loaded into one or more function registers, and chunks of input data 150 are iteratively loaded into a source register and processed using register function instruction 145, as described below in conjunction with FIG. 1D. Processor 120 includes vector processing units 126 to support SIMD instructions on vectors, such as registers 124A-124E in registers 122. On a hardware level, lookup table functionality within vector processing units 126 are fundamentally implementable by using multiplexors (MUX), for example. Function definition 155 is configured as a lookup table or truth table that is pre-calculated for the function, as illustrated in conjunction with FIG. 1C below.

While the example above uses processor 120 for processing of register function instruction 145, other implementations utilize other parallel processing units, such as graphics processing unit 170. For example, vectors and compute units of graphics processing unit 170 are utilized in a similar manner as registers 122 and vector processing units 126 of processor 120.

III. Example SIMD Instruction for Register Based Lookup Table Operation

FIG. 1B is a block diagram that depicts an example register function instruction 145 of FIG. 1A. As shown in FIG. 1B, the instruction name specifies an operation—here "vlut", or vector lookup table operation, as well as the data types or data sizes of the inputs and outputs as k and m respectively. Thus, for 8-bit inputs (k=8) and 1-bit outputs (m=1), the instruction name corresponds to "vlut_8_1".

Further, three register parameters are provided: a function definition register, an input data register, and an output data register. As shown in the example of FIG. 1B, the function definition register is defined as register 124A or R1, the input data register is defined as register 124B or R2, and the output data register is defined as register 124C or R3. While the examples shown use vector registers for the function definition registers, input data registers, and output data registers, other implementations may also use scalar registers for each of these registers. For example, scalar registers may be used for the input data registers and the output data registers by processing smaller batches of data for each register function instruction 145. Further, if the lookup table for function definition 155 can fit within one or more scalar registers, then the one or more scalar registers may also be used for the function definition registers. Thus, besides vector-based SIMD instructions, scaler-based (e.g. standard, non-SIMD) instructions may also be defined and used for the function processing described herein. Accordingly, examples that refer to SIMD instructions herein may be alternatively implemented using scalar instructions.

In some implementations, in-place operations are supported, wherein the input data register and the output data register are the same register. In this case, the SIMD instruction definition also allows for two function definition registers to be defined. This is helpful for ISAs that are limited to a maximum of three register parameters.

In some implementations, multiple function definition registers are sequentially implied by specifying only a first function definition register. For example, if a specified input data size (k) and output data size (m) of function definition 155 is determined to fit within four (4) data widths (w) of registers 122, then the next three (3) registers sequential to the first function definition register are implied to be reserved for storing function definition 155. Given that the register width "w=512" is known in advance, the number of registers "n" required for storing the function definition 155 can be determined by the formula n=ceiling(((2^k)*m)/w). An example instruction "vlut_8_8 R1, R5, R5" indicates k=8 and m=8, and therefore n=ceiling(((2^8)*8)/512)=4. Since "R1" is specified as the first function definition register and n=4, registers R2, R3, and R4 are further implied to be reserved for storing function definition 155. Note that the source and target registers do not necessarily need to sequentially follow the last implied register, or R4. For example, "vlut_8_8 R1, R8, R9" is also a valid instruction, wherein registers R1-R4 are used for the function definition registers, R8 is used as the source register, and R9 is used as the target register, with registers R5-R7 unused. Compilers for higher level languages are responsible for reserving the above described implied registers before generating machine code using such SIMD instructions, whereas programmers are responsible for register management when developing in assembly or machine language.

In some implementations, the output values stored in the output data register are padded to align with the input values from the input data register. For example, when using the "vlut_8_1" instruction, the 1-bit outputs are padded with 7 bits of zero padding bits so that the output values are aligned with the 8-bit input values. In other implementations, the output values are padded to align to a defined data size. In yet other implementations, no padding is performed. The padding behavior is definable as part of the SIMD instruction name. For example, an instruction "vlut_8_1_pad4" indicates padding 1-bit outputs to a 4-bit data size. Padding may be applied to either the most significant or least significant bit positions.

In some implementations, after padding, the output values are further shifted by applying a left shift operation (or right shift operation, depending on the padding bit positions). This facilitates combining results of multiple SIMD instructions with a simple OR operation. The shifting behavior is definable as part of the SIMD instruction name. For example, an instruction "vlutshift4_8_1" indicates left shifting the results by 4 bits, or by half of the 8 bits available in the padded 8-bit results.

In some implementations, when m>k, or when the output data size is larger than the input data size, the SIMD instructions may assume that the input values are loaded into the input data registers with padding to align with the output data size of m.

Thus, as illustrated by FIG. 1B, an ISA can support various SIMD instructions to support lookup table operations that use one or more registers for storing the lookup table, or function definition 155. While register instruction function 145 is defined generally for any k-bit sized input and m-bit sized output, in practical implementation an ISA limits instruction support to a smaller subset of commonly used data sizes.

IV. Example Lookup Table Function Definition

FIG. 1C is a block diagram that depicts an example function definition 155 of FIG. 1A. Continuing with the example wherein k=8 and m=1, the function accepts 8-bit inputs with a range of 0 to 255 (2^8−1) and provides 1-bit outputs with a range of 0 to 1 (2^1−1). A prime number function is used for illustrative purposes, wherein the function processes the input value to determine whether the input value is a prime number, and if so, a true or 1 value is returned as the result, otherwise a false or 0 value is returned. For example, for input value 7, the output value is 1 since 7 is a prime number, whereas for input value 8, the output value is 0 since 8 is divisible by at least 2.

The function can be pre-calculated for all possible input values, or values 0 to 255, to generate the output value column of function definition 155. When storing function definition 155, only the output value column needs to be stored, as the input value is implied by the index position or offset. Thus, 256 bits (2^8*1 bits) are required to store function definition 155. Accordingly, a lookup table can be generated for any function to be accelerated through lookup table operations.

V. Example Application Pseudocode

FIG. 1D is a block diagram that depicts example pseudocode for application 140 of FIG. 1A, and example data for registers 122 of FIG. 1A. As shown in the pseudocode, a first step is to load function definition 155 into register 124A or R1. Thus, function definition 155 is transferred from memory 130 to register 124A via data bus 160, resulting in register 124A containing the example data shown in registers 122, which matches the content of function definition 155 shown previously in FIG. 1C. Note that function definition 155 is read dynamically from memory 130, rather than being statically encoded at compile time within application 140.

In step 20, a next chunk of input data 150 is loaded into register 124B, or R2. For example, input data 150 corresponds to a file stored in non-volatile memory of memory 130. Assuming registers 122 have a width w=512 bits and k=8, each chunk corresponds to 64 input values (512/8). Thus, the next 64 8-bit values from input data 150 are read and loaded into register 124B. For purposes of illustration, the content of register 124B corresponds to loading the first 64 input values from input data 150. Thus, the values "37, 134, 2, 201 . . . 11" correspond to the first chunk of data values from input data 150.

In step 30, register function instruction 145 is invoked with an input data size of 8 bits, an output data size of 1 bit, register 124A or R1 defined for the function definition register, register 124B or R2 defined for the input data register, and register 124C or R3 defined for the output data register. Accordingly, the vector processing units 126 apply, in parallel, the function lookup table from register 124A (R1) to the 64 values in register 124B (R2) to generate the 64 output values in register 124C (R3).

For example, referring specifically to the 64th input value or index 63 of register 124B (R2), a value 11 is read by one of vector processing units 126. The value 11 is then used as the index for the lookup table or register 124A (R1). Register 124A (R1) stores a value of "1" for index 11 as shown in FIG. 1C, which means that the value 11 is a prime number. Accordingly, index 63 in register 124C (R3) is set to the value of 1, and the remaining 7 bits are padded with zeros to align the data with 8-bit wide boundaries. This same process is executed in parallel for each of the 64 input values in register 124B (R2).

In step 40, application 140 uses the output values in register 124C (R3) according to the requirements of application 140. For example, assume that the aim of application 140 is to determine a ratio of prime versus non-prime values from input data 150. In this case, step 40 uses the values in R3 to increment a counter for each prime number found, or for each output value matching 1 (true). After the completion of step 50, the counter represents a prime number total. The non-prime number total can be determined by subtracting from a file size of input data 150, and a ratio can be determined by dividing the prime number total by the non-prime number total.

In step 50, steps 20, 30 and 40 are iterated until no further chunks are available from input data 150. After step 50, processing of input data 150 through the function defined by function definition 155 is complete, and application 140 continues with other tasks, such as providing a report of the ratio of prime versus non-prime numbers. For example, for index 0, the input value "37" in register 124B is checked by referencing index "37" in register 124A, which returns a value of "1" or prime, which is output to index 0 of register 124C. For index 1, the input value "134" in register 124B is checked by referencing index "134" in register 124A, which returns a value of "0" or not prime, which is output to index 1 of register 124C. This process is carried out in parallel for each index so that all output values are provided in register 124C, which can then be summed together to provide a total number of prime values in a given chunk of input data 150. By maintaining a running total that is updated after processing each chunk of input data 150, a total number of prime values in the entirety of input data 150 can be determined. Further, with a known file size of input data 150, a total number of non-prime values in input data 150 and a ratio of prime versus non-prime values in input data 150 can also be determined, and the results can be reported to the user.

VI. Using Register Based SIMD Lookup Table Operations

A. Example Process using Function with 8-bit Inputs, 1-bit Outputs

FIG. 2A is a block diagram that depicts SIMD processing of a lookup table operation with an example function using 8-bit inputs and 1-bit outputs, wherein a lookup table for the function is stored in register 124A. As shown in register 124A (R1), the lookup table only requires the first 256 bits for storing function definition 155, and thus the remaining 256 bits are unused. The function definition 155 used in FIG. 2A corresponds to the same function definition 155 shown in FIG. 1C.

As discussed above, each of the values in register 124B (R2) is processed in parallel by vector processing units 126. Thus, for each value in indexes 0 through 63 of register 124B (R2), the output value in the lookup table stored in register 124A (R1) is referenced and output to register 124C (R3). The values in register 124B of FIG. 2A correspond to the same values in register 124B of FIG. 1D. Thus, for index 0 of register 124B (R2), the input value is 37, and thus index 37 is referenced in register 124A (R1) to retrieve the output value 1, which is then output to bit offset 0 with bit offsets 1-7 padded with zeroes. Similarly, for index 1 of register 124B (R2), the input value is 134, and thus index 134 is referenced in register 124A (R1) to retrieve the output value 0, which is then output to bit offset 8 with bit offsets 9-15 padded with zeroes. In the example shown, the output values are placed in the most significant bit positions (left bits) and the padding is placed in the least significant bit positions (right bits). However, other implementations may place the output values in the least significant bit positions (right bits) and the padding in the most significant bit positions (left bits). Further, depending on the chosen placement, the shift instructions such as "vlutshift4_8_1" may shift either left or right to move the output values into the padding area.

After the parallel processing by vector processing units 126, the output values are stored in register 124C (R3). Thus, register 124C now indicates whether each of the 64 input values are prime numbers (1/true) or non-prime numbers (0/false).

B. Example Process using Function with 8-bit Inputs, 2-bit Outputs

Figure 2B:
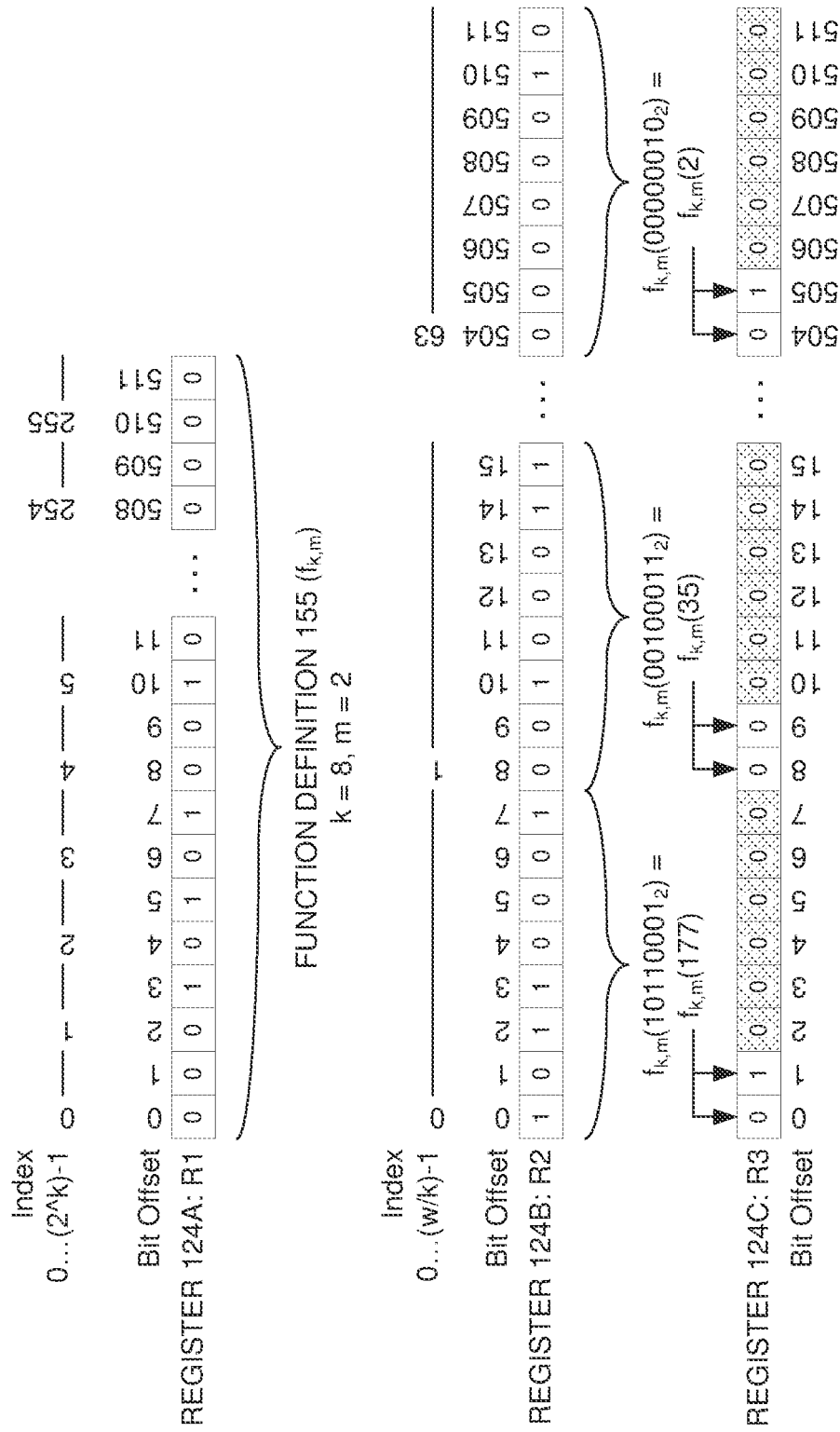
FIG. 2B is a block diagram that depicts SIMD processing of a lookup table operation with an example function using 8-bit inputs and 2-bit outputs, wherein a lookup table for the function is stored in register 124A.

FIG. 2B is a block diagram that depicts SIMD processing of a lookup table operation with an example function using 8-bit inputs and 2-bit outputs, wherein a lookup table for the function is stored in register 124A. As shown in register 124A (R1), the lookup table now uses the entire width of the register, or all 512 bits.

The process in FIG. 2B proceeds similarly to FIG. 2A, but now the output values are 2-bit with 6 bits of padding instead of 1-bit with 7 bits of padding. For example, function definition 155 corresponds to a function that maps 8-bit inputs corresponding to 4 sequential deoxyribonucleic acid (DNA) base pairs to 2-bit outputs that specify a position wherein an A base is first found in the 8-bit input, starting from the least significant or rightmost position. Each base pair is represented by two bits: an example mapping is 00=A, 01=T, 10=C, and 11=G.

Thus, for index 0 in register 124B (R2), the input value is the 8-bit value "10110001" or 177, which corresponds to the DNA base pairs "CGAT". Since the base pair "A" is in the second position from the right, the output result is "01" or 1. If the function instead specified a position wherein a C, G, or T base is first found, then the output results would be "11" or 3, "10" or 2, and "00" or 0, respectively. In this manner, the position of a specific DNA base can be quickly found using SIMD processing with register-based lookup tables, thereby avoiding the various shift, mask, extract, test, and other operations that would otherwise be normally required.

The specific values loaded into register 124A (R1) from function definition 155 are only exemplary. Since function definition 155 is dynamically loaded at run-time, the function definition 155 can correspond to any of the possible permutations for the lookup table (512 possibilities for 8-bit input and 2-bit output). Thus, function definition 155 can be flexibly defined and even modified at run-time, in comparison to statically encoded lookup tables that remain fixed at compile time.

C. Example Process using Function with 8-bit Inputs, 4-bit Outputs

Figure 2C:
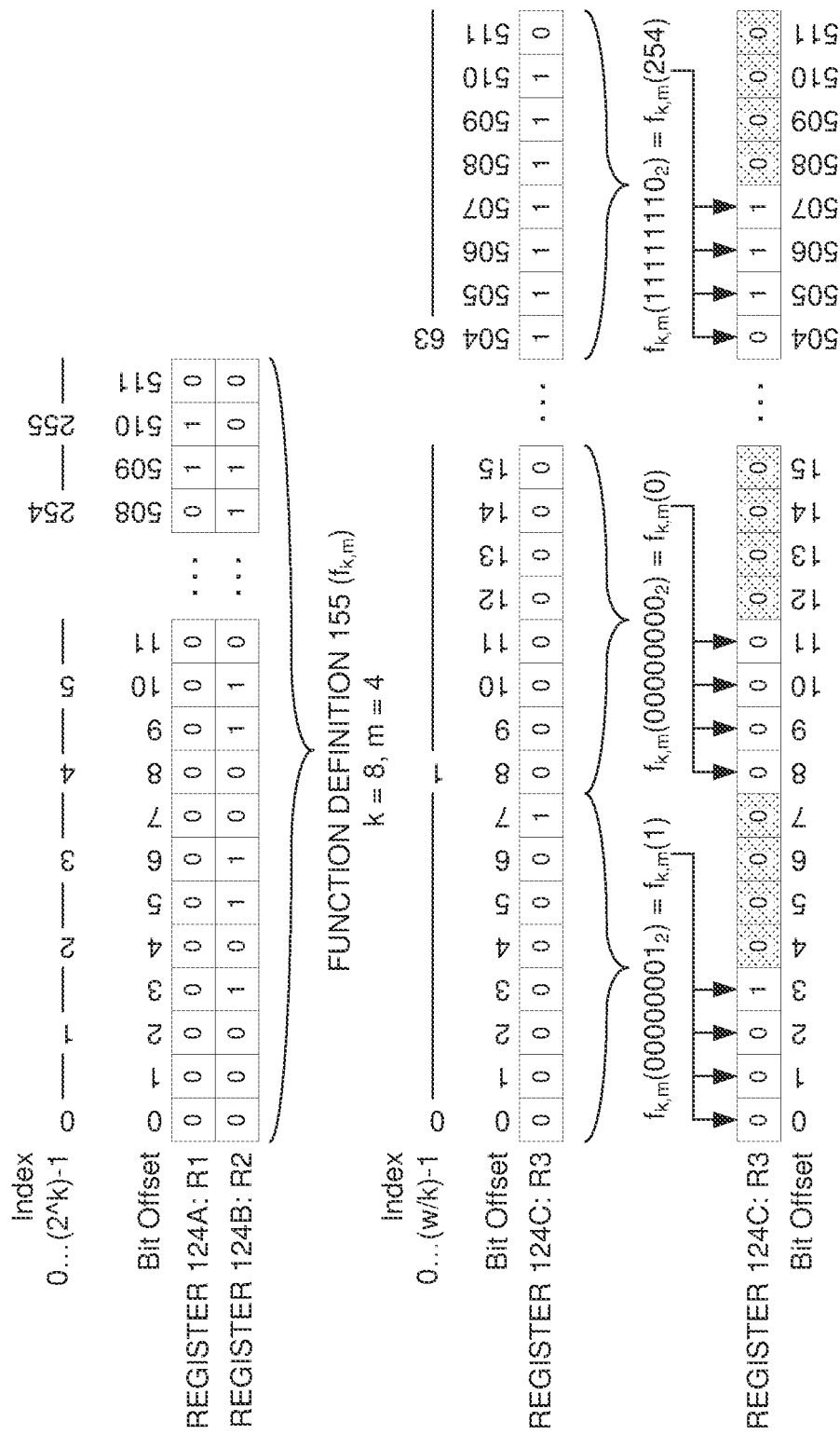
FIG. 2C is a block diagram that depicts SIMD processing of a lookup table operation with an example function using 8-bit inputs and 4-bit outputs, wherein a lookup table for the function is stored in registers 124A and 124B.

FIG. 2C is a block diagram that depicts SIMD processing of a lookup table operation with an example function using 8-bit inputs and 4-bit outputs, wherein a lookup table for the function is stored in registers 124A and 124B. As shown in FIG. 2C, since the lookup table is 1024 bits ($2^8*4$), the lookup table no longer fits within a single register and multiple function registers are necessary. The output values are divided into the registers according to architecture requirements.

For example, in one implementation, the most significant index bits are used to divide the output values among the available registers, which effectively divides registers into sequential ranges of output values. For example, register 124A (R1) holds the full 4-bit output values for indexes 0-127 (most significant index bit 0), and register 124B (R2) holds the full 4-bit output values for index 128-255 (most significant index bit 1).

In another implementation, the bit positions within the output values are used to divide the lookup table entries among the available registers, which effectively spreads portions of each individual output value across registers. In the example shown in FIG. 2C, such division by bit positions is used: register 124A (R1) holds the most significant or upper two bits of each output value in indexes 0-255 and register 124B (R2) holds the least significant or lower two bits of each output value in indexes 0-255.

As discussed above, in some implementations the source and target registers in a SIMD instruction are the same register. Thus, as shown in FIG. 2C, the input values in register 124C (R3) are overwritten in-place with the output values.

The function defined by function definition 155 can support a wide range of commonly used functions, such as counting a leading or trailing number of 1s or 0s in a byte, determining a leftmost or rightmost bit position of a first 1 or 0 in a byte, or other functions.

D. Extensions for Large Lookup Tables

As discussed above, in some implementations the SIMD instructions support implied sequential function definition registers to support very large lookup tables that need to span across multiple registers. The entries in the lookup tables are divided according to most significant index bits or output value bit positions, as discussed above. Further, as discussed above, in some implementations the lookup table operations are supported by elements of other parallel processing devices such as GPU 170, e.g. by GPU scratchpad memory and GPU parallel processing units.

Further, as discussed above, in some implementations the output is optionally bit shifted to facilitate OR operations. For example, a "vlut_8_4" output is combined or ORed with a "vlutshift_8_4" output to generate output results for an effectively 8-bit input, 8-bit output function. In some implementations, the "vlut" and "vlutshift" operations use the same lookup tables; in other implementations, the "vlut" and "vlutshift" operations use different lookup tables.

By supporting 8-bit input, 8-bit output lookup tables, SIMD instructions using register-based lookup tables support the acceleration of traditionally expensive operations such as bit reversal, bit compaction, static bit permutations and shuffles, character or text transformations, and others.

VII. Example Register Based SIMD Lookup Table Operation Process

FIG. 3 is a flow diagram that depicts a process 300 for implementing register-based SIMD lookup table operations. In step 310, referring to FIG. 1A, processor 120 receives register function instruction 145 for applying a function to a plurality of input values in register 124B (R2), wherein register function instruction 145 specifies register 124A (R1) that stores a lookup table. For example, function definition 155 may be pre-calculated as the lookup table for the function. Referring to FIG. 1B, register function instruction 145 is defined using a similar instruction format as indicated, and referring to FIG. 1C, an example lookup table is pre-calculated for a function that determines whether an input value is a prime number or a non-prime number. Prior to step 310, register 124A (R1) is already loaded with function definition 155, as indicated in step 10 of the pseudocode of application 140 shown in FIG. 1D.

In step 312, processor 120 stores a plurality of output values into register 124C (R3) by referencing the lookup table, from register 124A (R1), for each of the plurality of input values in register 124B (R2) in parallel. For example, referring to FIG. 2A, each of the 64 input values in register 124B is processed using vector processing units 126 to determine 64 output values from lookup operations in register 124A (R1), wherein the 64 output values are stored into register 124C (R3). Optionally, the output data is padded to align with a defined data size. Optionally, the output data is further left or right shifted. As discussed above, some implementations use multiple registers to store the lookup table, as illustrated by FIG. 2C. Further, as discussed above, in some implementations, scalar registers are used instead of vector registers for the source register, target register, and at least one function register.

The invention claimed is:

1. A computing device comprising:
   a plurality of registers including a source register and at least one function register;
   the computing device configured to:
   receive an instruction for applying a function to a plurality of input values in the source register, wherein the instruction specifies the at least one function register that stores a single lookup table; and
   store a plurality of output values into a target register of the plurality of registers by referencing the single lookup table, from the at least one function register, for each of the plurality of input values in the source register in parallel; and
   wherein the instruction specifies a first aggregate data size for each of the plurality of input values and a second aggregate data size for each of the plurality of output values, and wherein the second aggregate data size is different from the first aggregate data size.

2. The computing device of claim 1, wherein the computing device comprises at least one of a central processing unit (CPU) or a graphics processing unit (GPU).

3. The computing device of claim 1, wherein the first aggregate data size is greater than the second aggregate data size.

4. The computing device of claim 3, wherein the computing device is configured to store the plurality of output values into the target register by padding the plurality of output values to a third aggregate data size that is larger than the second aggregate data size.

5. The computing device of claim 4, wherein the third aggregate data size is equal to the first aggregate data size.

6. The computing device of claim 4, wherein the computing device is configured to store the plurality of output values into the target register by further shifting the plurality of output values.

7. The computing device of claim 1, wherein the target register is the same as the source register.

8. The computing device of claim 1, wherein the at least one function register comprises a plurality of function registers that are sequentially implied from a first function register specified in the instruction.

9. The computing device of claim 1, wherein a plurality of entries in the single lookup table are divided into the at least one function register according to at least one of: most significant index bits of the plurality of entries, or bit positions in the plurality of entries.

10. The computing device of claim 1, wherein the single lookup table is calculated for the function.

11. A method comprising:
receiving an instruction for applying a function to a plurality of input values in a source register, wherein the instruction specifies at least one function register that stores a single lookup table; and
storing a plurality of output values into a target register of a plurality of registers by referencing the single lookup table, from the at least one function register, for each of the plurality of input values in the source register in parallel; and
wherein the instruction specifies a first aggregate data size for each of the plurality of input values and a second aggregate data size for each of the plurality of output values, and wherein the second aggregate data size is different from the first aggregate data size.

12. The method of claim 11, wherein the first aggregate data size is greater than the second aggregate data size.

13. The method of claim 12, wherein storing the plurality of output values into the target register pads the plurality of output values to a third aggregate data size that is larger than the second aggregate data size.

14. The method of claim 13, wherein the third aggregate data size is equal to the first aggregate data size.

15. The method of claim 13, wherein storing the plurality of output values into the target register further shifts the plurality of output values.

16. The method of claim 11, wherein the instruction is a single instruction, multiple data (SIMD) instruction.

17. The method of claim 11, wherein the target register is the same as the source register.

18. The method of claim 11, wherein the at least one function register comprises a plurality of function registers that are sequentially implied from a first function register specified in the instruction.

19. The method of claim 11, wherein a plurality of entries in the single lookup table are divided into the at least one function register according to at least one of: most significant index bits of the plurality of entries, or bit positions in the plurality of entries.

20. The method of claim 11, wherein the single lookup table is calculated for the function.

* * * * *